UNITED STATES PATENT OFFICE.

ALEXANDER BOAG, OF JACKSON, MICHIGAN, ASSIGNOR OF SEVEN-EIGHTHS HIS RIGHT TO OLIVER P. COATS, OF SAME PLACE.

IMPROVEMENT IN COMPOSITIONS FOR STONE CEMENTS.

Specification forming part of Letters Patent No. 165,533, dated July 13, 1875; application filed April 17, 1875.

*To all whom it may concern:*

Be it known that I, ALEXANDER BOAG, of Jackson, in the county of Jackson and State of Michigan, have invented a certain Compound called Stone Cement, to be used for stuccoing and other purposes, of which the following is a specification:

To prepare the cement I take rock-gypsum and calcine it in the usual manner. I then make a solution of saltpeter, one pound to four gallons of soft water, in which I place the calcined rock-gypsum until it is thoroughly saturated, after which I submit it to a moderate heat to evaporate the water, leaving the saltpeter incorporated. I then grind it between stones as fine as possible, and bolt it to remove any lumps or coarse particles.

The cement thus prepared, as described, can be tempered with water to the consistency of thin mortar and applied to walls and ceilings, either directly or as a finishing coat on or over common plaster, and when dry will present a hard, smooth, marble-like surface, which the elements will not affect.

What I claim as my invention is—

The herein-described stone cement, made by combining saltpeter with calcined gypsum, substantially in the manner and proportions set forth, and pulverizing the compound, as described.

ALEXANDER BOAG.

Witnesses:
GEO. E. BEEBE,
JAS. A. DYER.